(12) United States Patent
Colombo et al.

(10) Patent No.: US 10,647,159 B2
(45) Date of Patent: *May 12, 2020

(54) TYRE FOR VEHICLE WHEELS HAVING IMPROVED TREAD PATTERN

(71) Applicant: PIRELLI TYRE S.p.A., Milan (IT)

(72) Inventors: Gianfranco Colombo, Milan (IT); Stefano Montesello, Milan (IT); Roberto Sangalli, Milan (IT)

(73) Assignee: PIRELLI TYRE S.p.A., Milan (IT)

(*) Notice: Subject to any disclaimer, the term of this patent is extended or adjusted under 35 U.S.C. 154(b) by 0 days.

This patent is subject to a terminal disclaimer.

(21) Appl. No.: 16/257,919

(22) Filed: Jan. 25, 2019

(65) Prior Publication Data

US 2019/0152270 A1 May 23, 2019

Related U.S. Application Data

(63) Continuation of application No. 14/657,574, filed on Mar. 13, 2015, now Pat. No. 10,214,055, which is a
(Continued)

(51) Int. Cl.
*B60C 11/11* (2006.01)
*B60C 11/03* (2006.01)
(Continued)

(52) U.S. Cl.
CPC ...... *B60C 11/0304* (2013.01); *B60C 11/0302* (2013.01); *B60C 11/0306* (2013.01);
(Continued)

(58) Field of Classification Search
CPC ............ B60C 11/0302; B60C 11/0304; B60C 11/0311; B60C 2011/0383; B60C 2011/0313
See application file for complete search history.

(56) References Cited

U.S. PATENT DOCUMENTS 5,088,536 A 2/1992 Graas et al.
5,178,697 A 1/1993 Watanabe et al.
(Continued)

FOREIGN PATENT DOCUMENTS

DE 197 05 196 A1 10/1997
EP 0 139 606 5/1985
(Continued)

OTHER PUBLICATIONS

International Preliminary Report on Patentability for International Application No. PCT/EP2006/012389 dated Jun. 23, 2009.
(Continued)

*Primary Examiner* — Steven D Maki
(74) *Attorney, Agent, or Firm* — Finnegan, Henderson, Farabow, Garrett & Dunner, L.L.P.

(57) ABSTRACT

A tyre for vehicle wheels having a tread pattern includes: a) two circumferential grooves, which define a first and a second shoulder region, and one central region; b) a plurality of asymmetric transverse grooves having a substantially "V" shape, which extend for the whole width of the tread, including an alternate sequence of a first and a second asymmetric transverse groove defining an alternate sequence of a first and a second asymmetric module; and c) a plurality of lateral transverse grooves, which includes one first lateral transverse groove extending for the whole width of the first shoulder region and for a portion of the central region of the first asymmetric modules, and one second lateral transverse groove extending for the whole width of the second shoulder region and for a portion of the central region of the second asymmetric modules.

1 Claim, 12 Drawing Sheets

Related U.S. Application Data continuation of application No. 12/448,343, filed as application No. PCT/EP2006/012389 on Dec. 21, 2006, now abandoned.

(51) Int. Cl.
- *B60C 11/12* (2006.01)
- *B60C 11/04* (2006.01)
- *B60C 11/13* (2006.01)

(52) U.S. Cl.
CPC ......... *B60C 11/0311* (2013.01); *B60C 11/042* (2013.01); *B60C 11/1263* (2013.01); *B60C 11/13* (2013.01); *B60C 2011/0313* (2013.01); *B60C 2011/0383* (2013.01); *B60C 2011/1209* (2013.01)

(56) References Cited

U.S. PATENT DOCUMENTS

| | | |
|---|---|---|
| 5,291,929 A | 3/1994 | Daisho et al. |
| 5,435,366 A | 7/1995 | Voigt et al. |
| 5,658,404 A | 8/1997 | Brown et al. |
| 6,527,023 B1 | 3/2003 | Takahashi |
| D512,680 S * | 12/2005 | Dias .................. D12/536 |
| D549,157 S | 8/2007 | Maus |
| 10,214,055 B2 * | 2/2019 | Colombo ............ B60C 11/0302 |
| 2002/0005238 A1 | 1/2002 | Boiocchi et al. |
| 2004/0069390 A1 | 4/2004 | Cesarini et al. |
| 2004/0118494 A1 | 6/2004 | Liederer |

FOREIGN PATENT DOCUMENTS

| | | |
|---|---|---|
| EP | 0 268 436 A2 | 5/1988 |
| EP | 0 661 181 A1 | 7/1995 |
| EP | 0 681 929 A1 | 11/1995 |
| EP | 0 855 291 A2 | 7/1998 |
| GB | 2 261 195 A | 5/1993 |
| JP | 02-102802 A | 4/1990 |
| JP | 10-278513 A | 10/1998 |
| JP | 2001-225608 A | 8/2001 |
| WO | WO-02/068221 A1 | 9/2002 |
| WO | WO-02/068222 A1 | 9/2002 |

OTHER PUBLICATIONS

International Search Report from the European Patent Office in International Application No. PCT/EP2006/012389 dated Sep. 11, 2007.

* cited by examiner

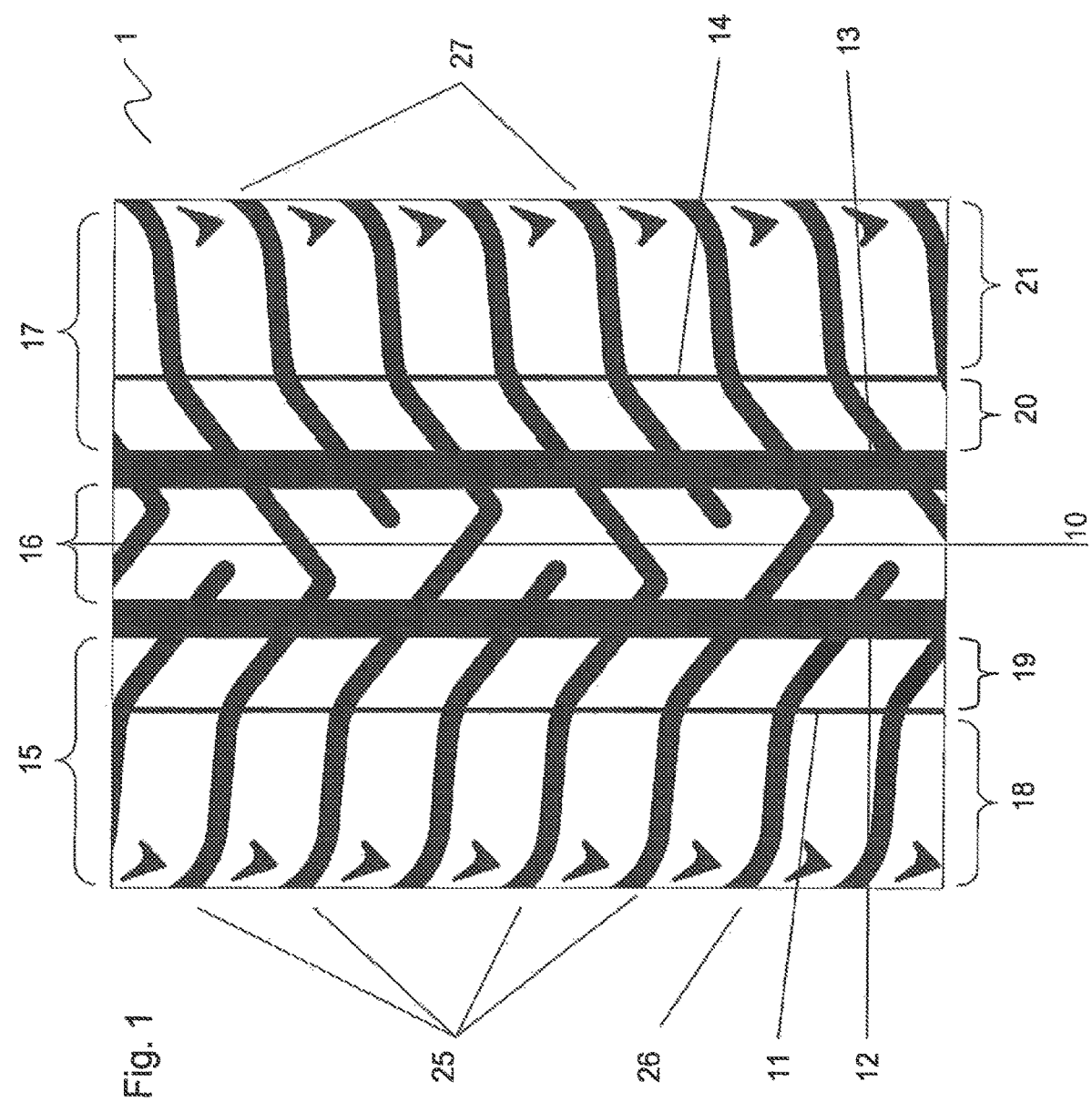

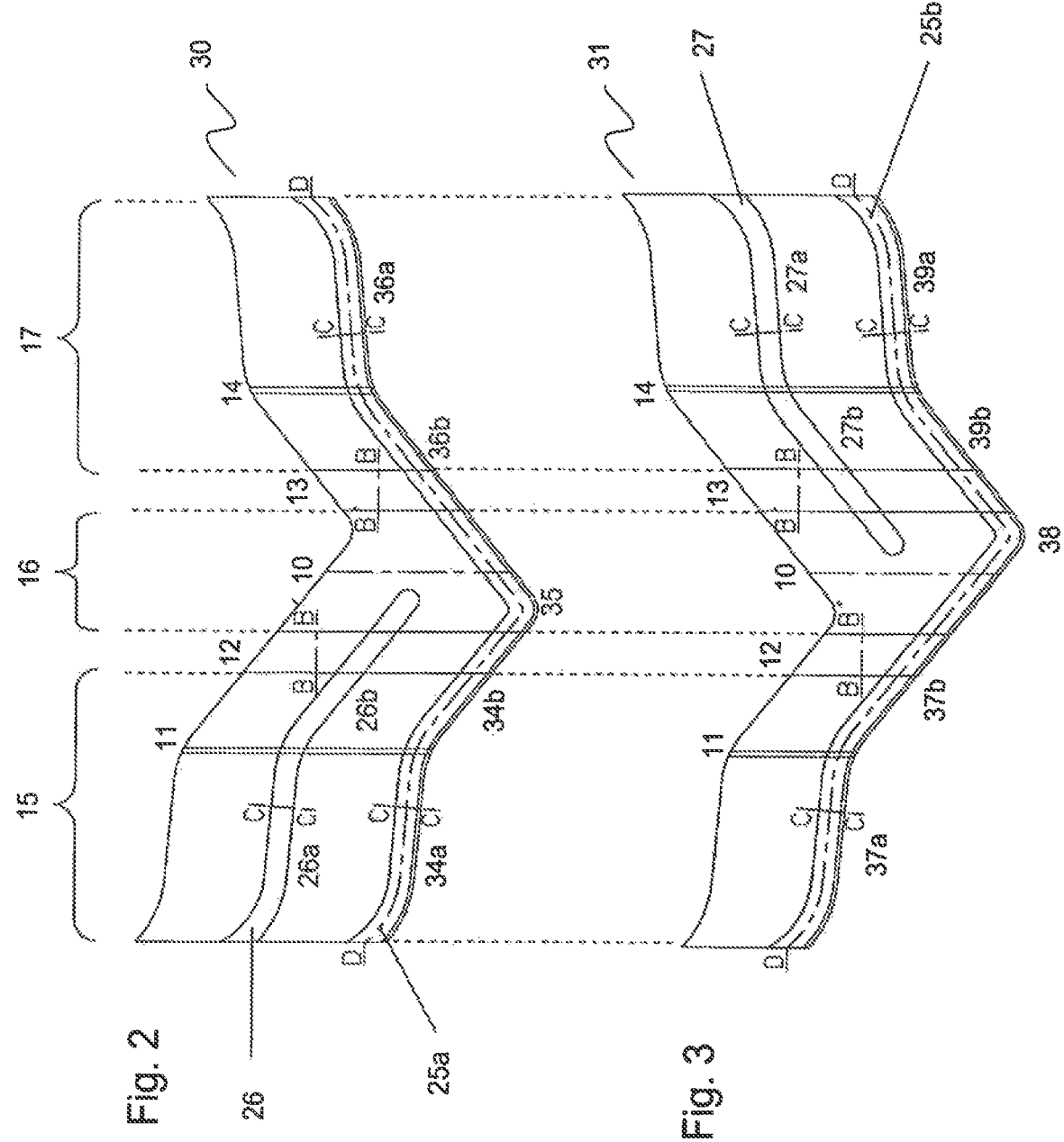

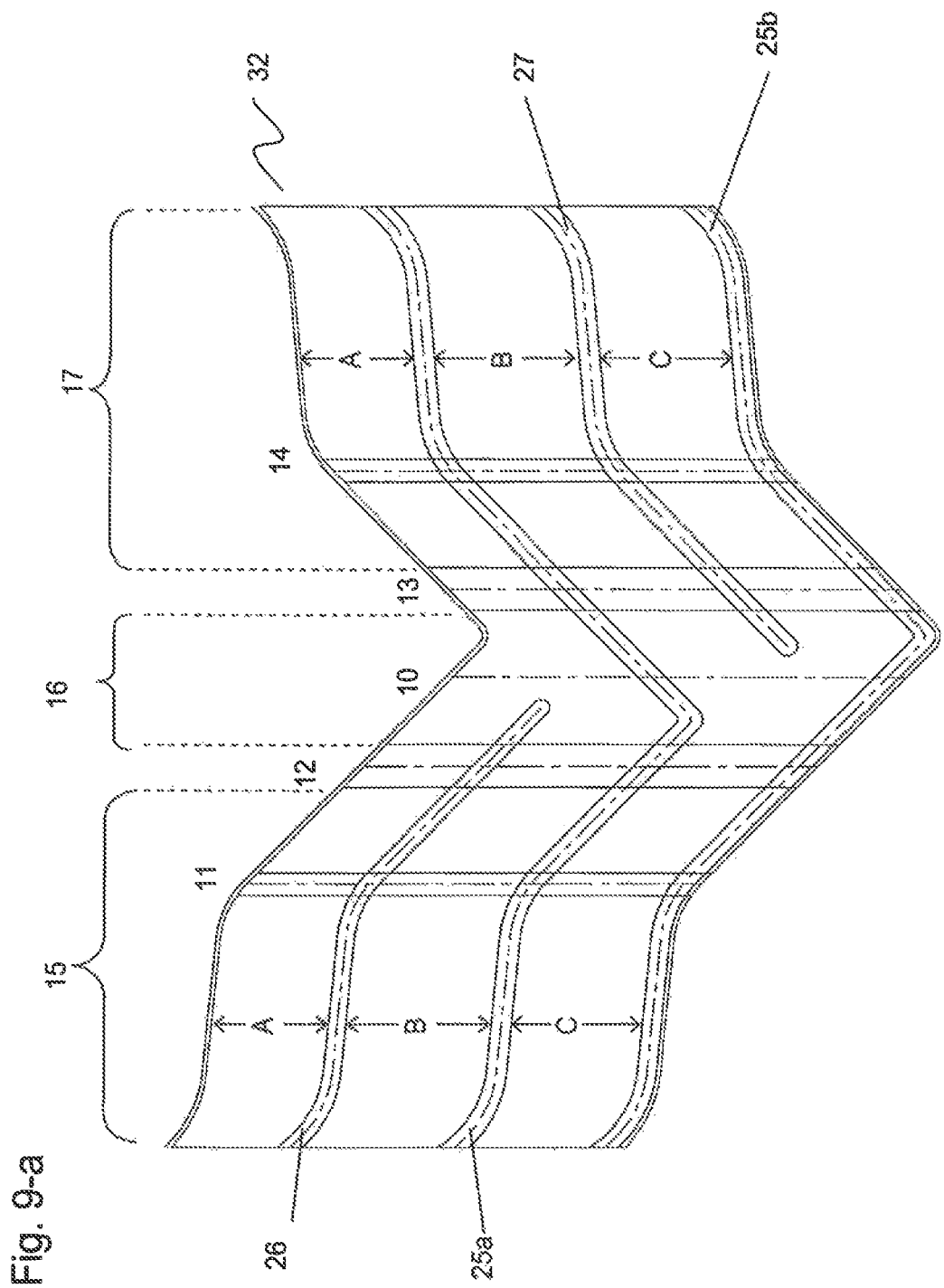

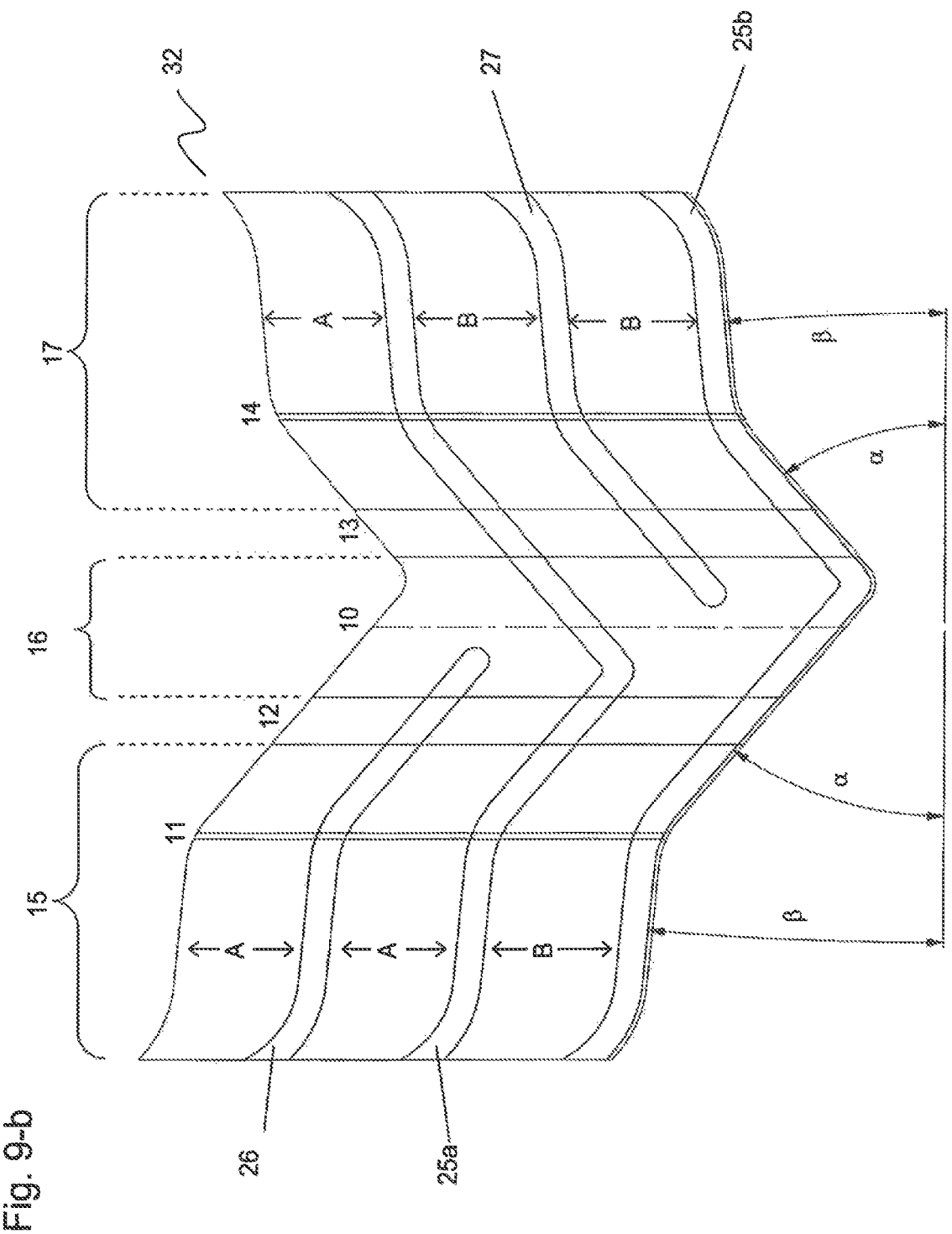
Fig. 9-b

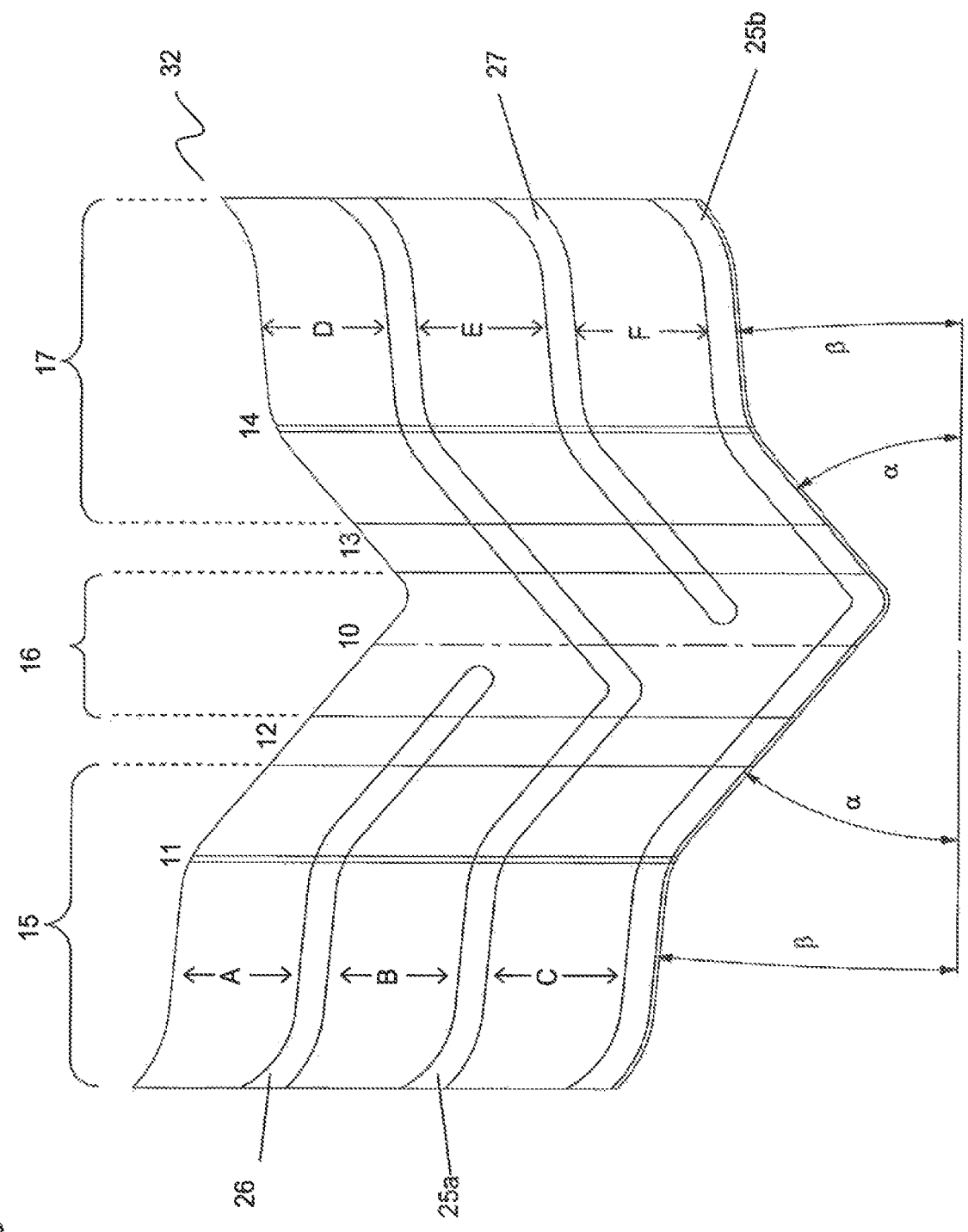
Fig. 9-c

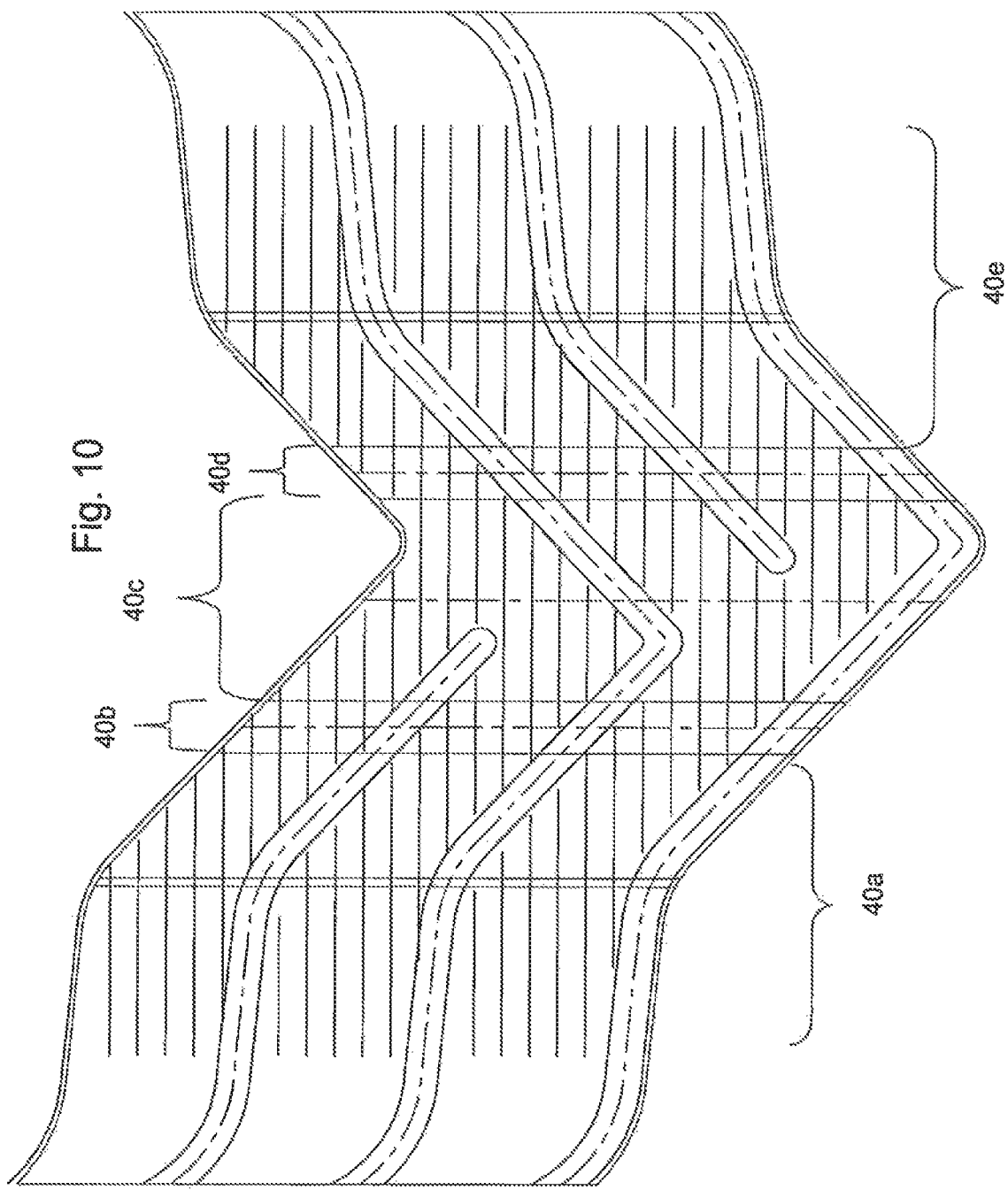

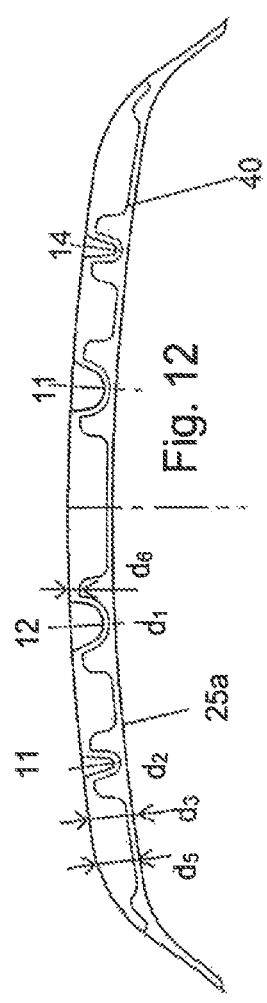
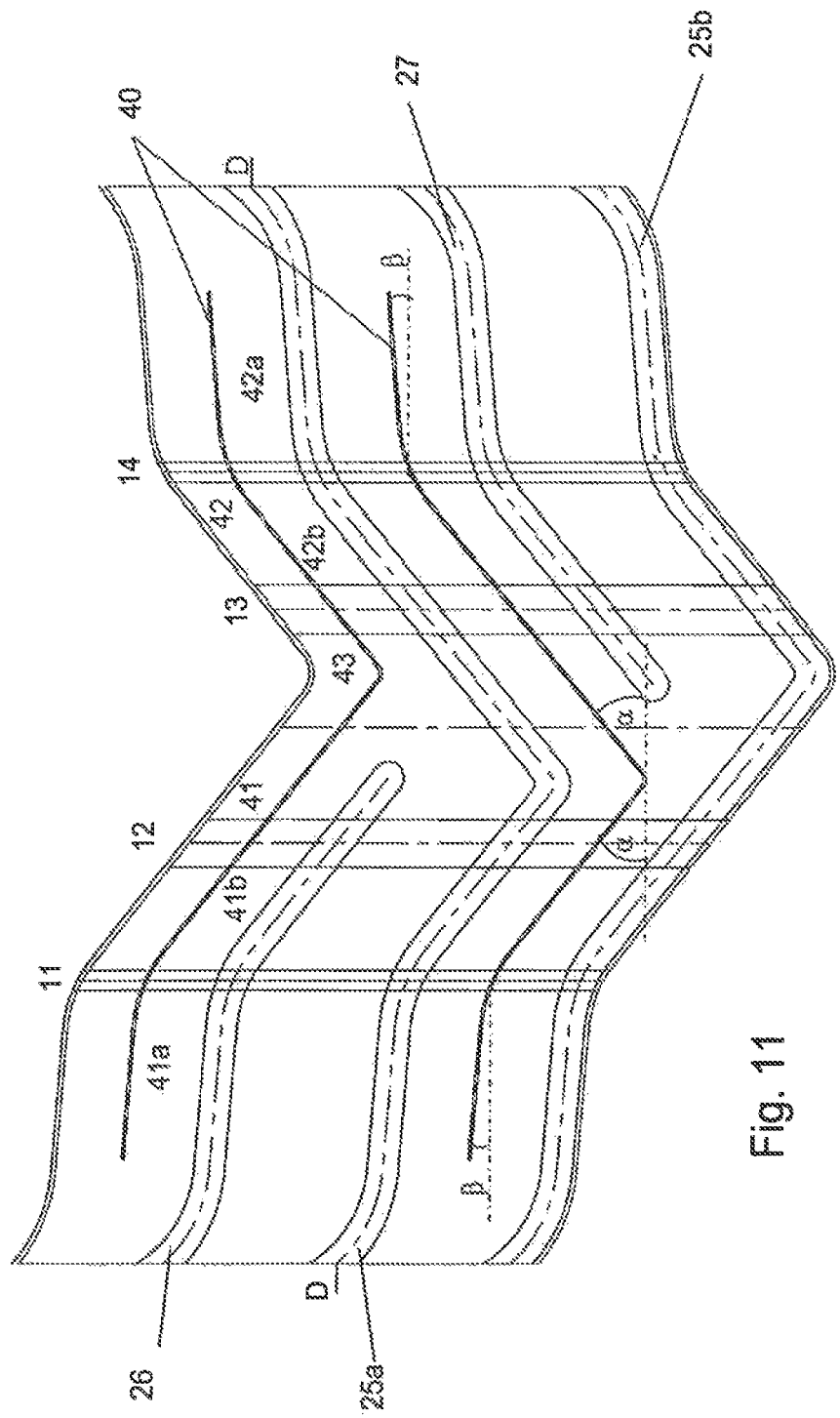

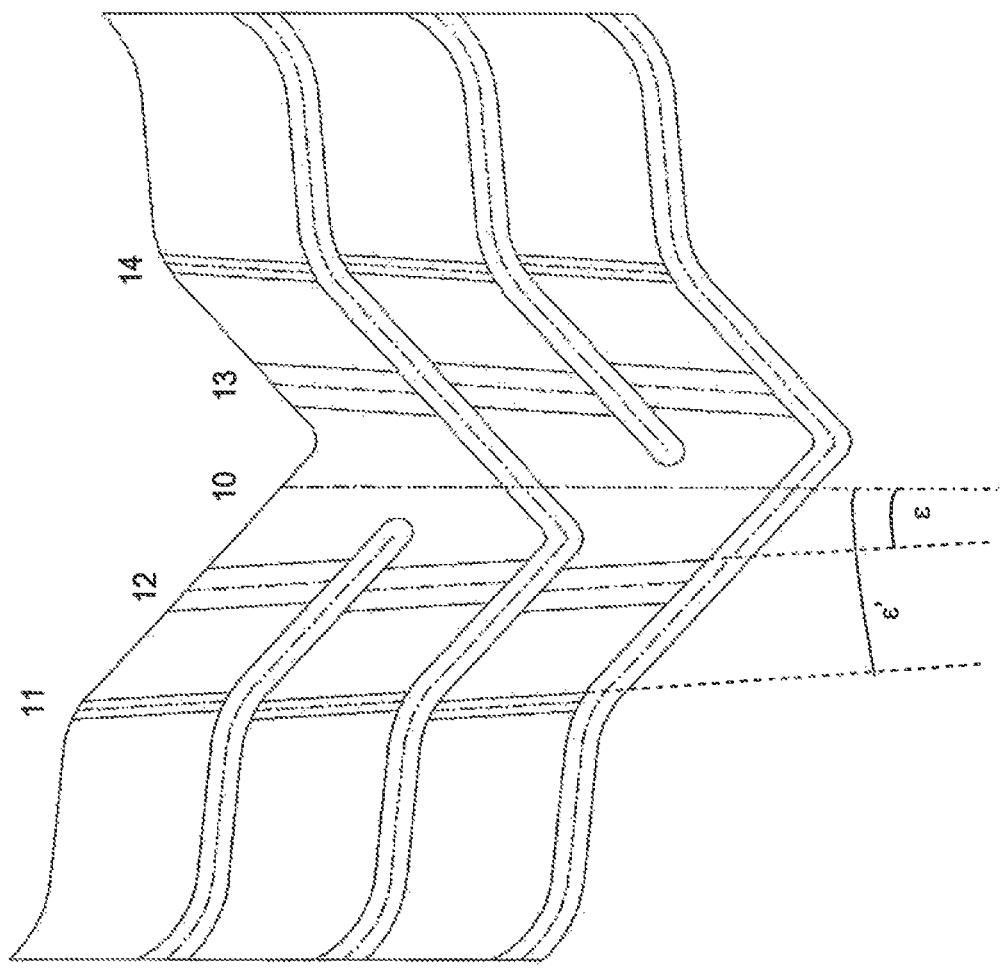

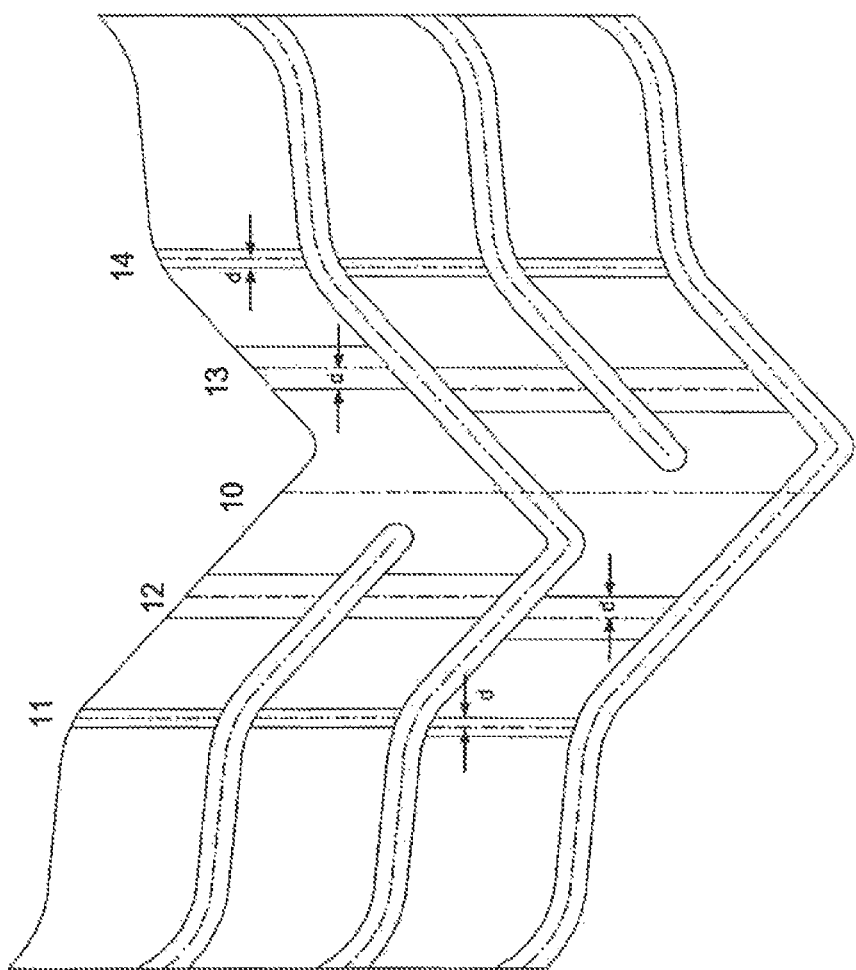

TYRE FOR VEHICLE WHEELS HAVING IMPROVED TREAD PATTERN

CROSS REFERENCE TO RELATED APPLICATIONS

This application is a continuation of U.S. patent application Ser. No. 14/657,574, filed Mar. 13, 2015, which is a continuation of U.S. patent application Ser. No. 12/448,343, which has a § 371(c) date of Jan. 28, 2010, and which is an entry into the national stage under 35 U.S.C. 371 of International PCT Application No. PCT/EP2006/012389, filed Dec. 21, 2006, all of which are incorporated herein by reference.

FIELD OF THE INVENTION

The present invention relates to a tyre for vehicle wheels having an improved tread pattern, more in particular to a winter tyre especially suitable for driving on snow and ice, and having good driving performance on wet and dry road.

BACKGROUND OF THE ART

A winter tyre is supposed to ensure good traction when used on snow and ice. However, a winter tyre also needs to provide good driving characteristics when used on dry or wet roads.

Winter or snow tyres have been designed with treads having traction blocks widely spaced by large and deep grooves that allow a good traction and brake on snow. The presence of large and deep traction grooves increases the void-to-rubber ratio of the tread, also simply named void ratio i.e., the amount of open space compared to the amount of rubber in the tread. A low void ratio means more rubber in contact with the road and vice versa. The high void ratio tread pattern is excellent in deep snow because snow is trapped in the void spaces and increases the grip. However, these tread patterns reduce the stiffness of the tread and generate substantial noise and block mobility when used on wet or dry roads. Moreover, the tread wear rate is rapid and therefore these tyres are considered for use only during the snowy winter months. Additionally, these tyres are not particularly well suited for icy road conditions.

The use of treads having a high density of transverse sipes made on the blocks has provided a good improvement to both snow and ice traction performance. Such heavily bladed tyres can exhibit good winter ice traction performance by providing an increased number of tread edges to provide forward traction. However, an increased number of sipes again promotes a reduction of the stiffness of the tread with an increase of block mobility and noise during use.

Further, the performance of a tread on wet roads is increased by the presence of grooves able to drain water from the contact surface of the tread with the road. This is accomplished in the art by longitudinal or transverse grooves. The wider the groove, the higher the amount of drained water. However, broad longitudinal grooves reduce the traction on snow and broad transverse grooves reduce the stiffness of the tread, again increasing the noise and block mobility when driving on dry road.

In view of the above, it is clear that a winter tyre needs to satisfy several conflicting requirements in order to provide good performances on all the various road and weather conditions.

WO02/068221 and WO02/068222 in the name of the same Applicant disclose winter tyres comprising transverse grooves and two or three circumferential grooves defining a plurality of blocks disposed in central and shoulder rows. The transverse grooves have a curvilinear profile converging on the equatorial plane in the direction of rolling specified for the tyre. The frontal profiles of the axially adjacent portions of the circumferentially adjacent block comprise at least two successive curvilinear portions which are different from each other and are designed to form means of attenuating the noise arising from the contact of the tread pattern with dry roads when the tyre is in the rolling condition.

U.S. Pat. No. 5,435,366 discloses a pneumatic tyre with tread having good aquaplaning performance and good winter characteristics comprising tread blocks of a central block row separated from one another by inclined grooves which consist of two angularly extending groove sections which meet at the central circumferential plane. Furthermore, two circumferential grooves extend at an acute angle to the circumferential plane of the tyre in the region of the blocks which bound them at the sides.

EP 661,181 discloses a pneumatic tyre comprising a main groove extending in the circumferential direction of a tyre and lateral grooves extending in the axial direction of the tyre, the lateral grooves intersecting the main groove to divide the main groove into a plurality of main groove parts each extending between the circumferentially adjacent intersections of the lateral grooves with the main groove, the main groove parts having at least two different circumferential pitch lengths, a short one and a long one. The characteristic tread pattern disclosed in such a patent provides a pneumatic tyre in which the wandering phenomenon caused by the lateral rain grooves is prevented and the running noise due to air resonance in the main grooves is effectively reduced without sacrificing wet performance.

European Patent No. 139,606 and U.S. Pat. No. 5,088,536 disclose tread patterns which provide acceptable all season performance while maintaining ride, noise and handling characteristics.

The Applicant has found that the winter tyres disclosed in the above patent references suffer of an excessive flexibility of the blocks which worsen the driving performance on dry or wet roads, in particular when steering at medium and high speeds, and can be improved having regard their performance on snow and ice.

The Applicant has perceived that in spite of the efforts made to improve the overall characteristics of a winter tyre, there is still the need to provide a winter tyre which combines good grip on snowy or iced roads with good driving performance on dry or wet roads and an acceptable level of noise and wear.

The Applicant has found that such a combination of characteristics can be advantageously achieved by providing a tyre with a tread pattern comprising: 1) at least two circumferential grooves, which define two shoulder regions, namely a first and a second shoulder region, and at least one central region, 2) a plurality of asymmetric transverse grooves having a substantially "V" shape, which substantially extend for the whole width of the tread, said plurality of asymmetric transverse grooves comprising an alternate sequence of a first asymmetric transverse groove and a second asymmetric transverse groove defining an alternate sequence of a first asymmetric module and a second asymmetric module, both the first and second asymmetric modules extending in said two shoulder regions and said at least one central region, and 3) a plurality of lateral transverse grooves, which comprises at least one first lateral transverse groove substantially extending for the whole width of said first shoulder region and for a portion of said at least one central region of said first asymmetric modules, and at least one second lateral transverse groove substantially extending for the whole width of said second shoulder region and for a portion of said at least one central region of said second asymmetric modules.

Each sequence of a first asymmetric module and a second asymmetric module forms a main module resulting from the combination of the first asymmetric module and the second asymmetric module. Accordingly, the alternate sequence of first asymmetric modules and second asymmetric modules defines a repetitive sequence of such main modules.

According to the present invention, the plurality of asymmetric transverse grooves having a substantially "V" shape, together with the plurality of lateral transverse grooves, both crossing said at least two circumferential grooves, define in each sequence of said first asymmetric module and said second asymmetric a tread pattern wherein the shoulder portions comprise a sequence of n blocks and the central region comprises a sequence of n−1 blocks.

The Applicant has found that the above described tread pattern according to the invention allows to reduce the flexibility of the tread elements and the rolling noise, so improving the performance on dry roads, to provide a good drainage of water and a good grip on wet roads, and to have at the same time an effective grip on snow and ice.

In a preferred embodiment, said asymmetric transverse grooves having a substantially "V" shape are formed by a first and a second linear groove having a different length each other, each linear groove being preferably formed by an external portion and an internal portion having different orientation. The external portion forms an angle β having an absolute value of from 0° to 20°, more preferably from 0° to 15°, and most preferably from 0° to 10°, with respect to the radial plane of the tyre. The internal portion forms an angle α having an absolute value of from 15° to 65°, more preferably from 30° to 60°, and most preferably from 35° to 55°, with respect to the radial plane of the tyre. Accordingly, the internal portions form each other a central overall angle ranging from 50° to 150°. The asymmetric transverse grooves having a substantially "V" shape have the vertex in said at least one central portion of the tread and axially offset with respect to the equatorial plane of the tyre. First asymmetric transverse grooves have the vertex between the first circumferential groove and the equatorial plane of the tyre. Second asymmetric transverse grooves have the vertex between the second circumferential groove and the equatorial plane of the tyre.

Said lateral transverse grooves are preferably formed by an external portion and an internal portion having different orientation. The external portion forms an angle β having an absolute value of from 0° to 20°, more preferably from 0° to 15°, and most preferably from 0° to 10°, with respect to the radial plane of the tyre. The internal portion forms an angle α having an absolute value of from 25° to 65°, more preferably from 30° to 60°, and most preferably from 35° to 55°, with respect to the radial plane of the tyre. Said lateral transverse grooves end in said at least one central portion. The first lateral transverse grooves preferably end between the first circumferential groove and the equatorial plane of the tyre, but can also extend until to cross the equatorial plane and to end between the second circumferential groove and the equatorial plane of the tyre. The second lateral transverse grooves preferably end between the second circumferential groove and the equatorial plane of the tyre, but can also extend until to cross the equatorial plane and to end between the first circumferential groove and the equatorial plane of the tyre. The number of lateral transverse grooves provided in each first asymmetric module and second asymmetric module is not particularly limited and depends, on a matter of choice, from the number and dimension of the modules, from the number and distance of asymmetric transverse grooves and from the dimension of the tread. Preferably, the number of lateral transverse grooves presents in each first and second asymmetric modules is lower than five, more preferably lower than three, and still more preferably two or one.

The Applicant has found that the implementation of the above mentioned preferred embodiment can improve the water drainage when driving on soaked road and can improve the directionality and reduce the wear.

According to a preferred embodiment, the tread pattern further comprises a plurality of transverse sipes. The plurality of transverse sipes can be formed in said shoulder regions and/or said at least one central region of each of said first and second asymmetric modules. More preferably, the plurality of transverse sipes are formed in said at least one central region.

According to a further preferred embodiment, each of said first and second asymmetric modules comprises at least one transverse sipe formed in said at least one central region continuously joined to a corresponding sipe formed in at least one of said shoulder regions by a corresponding sipe formed in at least one of said circumferential grooves.

According to a more preferred embodiment of the present invention, each of said first and second asymmetric modules comprises at least one transverse sipe extending continuously from one shoulder region to the opposite shoulder region.

The Applicant has found that the implementation of the above mentioned preferred embodiment can further improve the effectiveness of the sipes in the traction and the grip on snow and/or ice. On the other hand, a lower number of sipes can be formed to obtain the same traction and grip of the tread on snow and/or ice. Consequently, the stiffness of the tread elements is increased so giving better performances in terms of rolling noise, driving stability and tread wear when driving on dry road.

For the purpose of better understanding the present invention, the term "asymmetric" refers to a pattern formed on the surface of the tread which is asymmetrical with respect to the equatorial plane of the tyre; the term "equatorial plane" means the plane perpendicular to the tyre axis of rotation and passing through the center of its tread; the term "radial plane" means a plane passing through and containing the tyre axis of rotation; the term "groove" means an elongated void area in a tread that may extend circumferentially or transversely; the term "sipe" means a thin cut formed into a tread.

Unless otherwise indicated in the present description, each angle—which is used to indicate the inclination of a given tread pattern element—is intended to be calculated as the angle defined between a radial plane of the tyre and the plane said given tread pattern element belongs to.

BRIEF DESCRIPTION OF THE DRAWINGS

FIG. 1 is a plan view of the tyre tread in accordance with an embodiment of the present invention.

FIG. 2 is a plan view of a first asymmetric module of a tyre tread in accordance with an embodiment of the present invention.

FIG. 3 is a plan view of a second asymmetric module of a tyre tread in accordance with an embodiment of the present invention.

FIG. 9-a is a plan view of the main module in accordance with a third embodiment of the present invention.

FIG. 9-b is a plan view of the main module in accordance with a fourth embodiment of the present invention.

FIG. 9-c is a plan view of the main module in accordance with a fifth embodiment of the present invention.

FIG. 10 is a plan view of the main module in accordance with an embodiment of the present invention showing a plurality of transverse sipes.

FIG. 11 is a plan view of the main module in accordance with an embodiment of the present invention showing a pair of continuous transverse sipes.

FIG. 12 is a cross section view through line D-D of FIG. 11 showing the transverse profile of a sidewall of the transverse groove and of a sidewall of a transverse sipe.

FIG. 13 is a plan view of the main module in accordance with a further embodiment of the present invention.

FIG. 14 is a plan view of the main module in accordance with a further embodiment of the present invention.

DETAILED DESCRIPTION OF THE INVENTION

Figure 4:
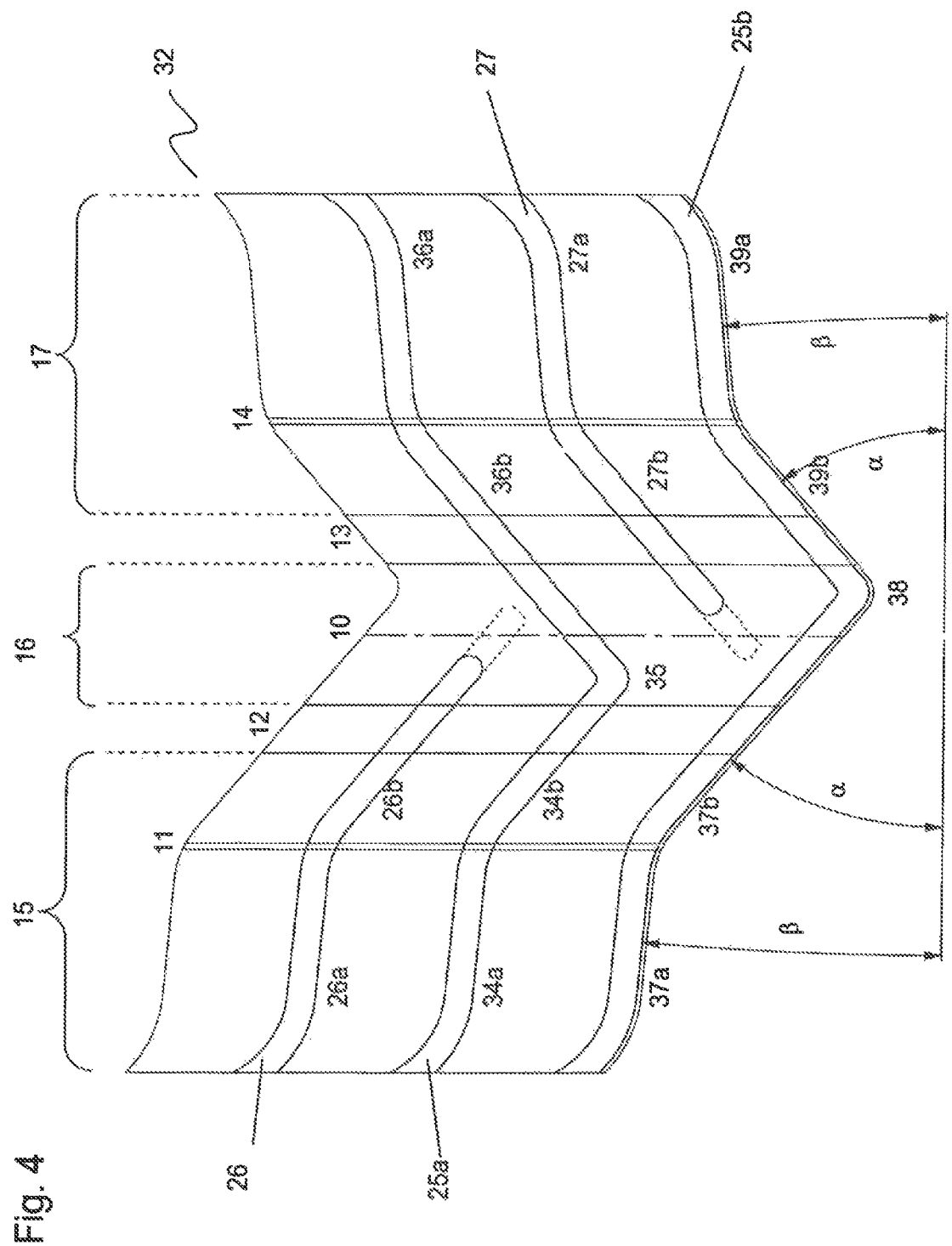
FIG. 4 is a plan view of the main module resulting from the combination of the first asymmetric module of FIG. 2 with the second asymmetric module of FIG. 3.

FIG. 1 is a plan view of the tyre tread 1 in accordance with a preferred embodiment of the present invention.

The tread 1 comprises two internal circumferential grooves 12 and 13, and, according to a preferred embodiment, two external circumferential grooves 11 and 14. The circumferential grooves 12 and 13 separate a tread central region 16 from two tread shoulder regions 15 and 17 located on the left and on the right of the equatorial plane 10, respectively. The circumferential grooves 11 and 14 divide in two portions each shoulder regions 15 and 17, respectively. The circumferential groove 11 divides the left shoulder regions 15 in an external shoulder portion 18 and an internal shoulder portion 19. The circumferential groove 14 divides the right shoulder regions 17 in an internal shoulder portion 20 and an external shoulder portion 21.

The tread 1 comprises a plurality of asymmetric transverse grooves 25 having a substantially "V" shape, which substantially extend for the whole width of the tread. Accordingly, the asymmetric transverse grooves 25 cross both the circumferential grooves 12 and 13 as well as the circumferential grooves 11 and 14, and extend in the tread central region 16 and in the tread shoulder regions 15 and 17.

The tread 1 also comprises a plurality of lateral transverse grooves 26 and 27. The lateral transverse grooves 26 and 27 are interposed and alternate between a pair of transverse groove 25, in a manner that will be better explained below. The lateral transverse grooves 26 extend in the shoulder regions 15 and for a portion of the central region 16, and the lateral transverse grooves 27 extend in the shoulder regions 17 and for a portion of the central region 16, in a manner that will be better explained below. Accordingly, the lateral transverse grooves 26 cross both the circumferential grooves 11 and 12, and the lateral transverse grooves 27 cross both the circumferential grooves 13 and 14.

The plurality of asymmetric transverse grooves comprises an alternate sequence of first asymmetric transverse grooves 25a and second asymmetric transverse grooves 25b defining an alternate sequence of a first asymmetric module 30, better illustrated in FIG. 2, and a second asymmetric module 31, better illustrated in FIG. 3 extending in the shoulder regions 15 and 17 and the central region 16.

Each sequence of a first asymmetric module 30 and a second asymmetric module 31 defines the main module 32, better illustrated in FIG. 4. The main module 32 of FIG. 4 is obtained by the combination of the first asymmetric module 30 of FIG. 2 and the second asymmetric module 31 of FIG. 3. Accordingly, the alternate sequence of first asymmetric modules 30 and second asymmetric modules 31 defines a repetitive sequence of main modules 32.

The tread 1 of FIG. 1 is formed by a plurality of such main modules 32, and typically comprises a number of main modules 32 ranging from 20 to 50.

A main module 32 of the tread 1 of FIG. 1 is shown in FIG. 4.

The main module 32 comprises a portion of the circumferential grooves 12 and 13 extending for the whole length of the main module 32. The circumferential grooves 12 and 13 define in the main module 32 a left shoulder region 15, a central region 16, and a right shoulder region 17. The width aspect ratio between the shoulder region 15, the central region 16, and the right shoulder region preferably ranges from 30:40:30 to 45:10:45, more preferably from 35:30:35 to 40:20:40. According to the preferred embodiment of FIG. 4, the main module 32 also comprises circumferential grooves 11 and 14 extending for the whole length of the main module 32. The circumferential groove 11 divides the left shoulder region 15 in an external portion 18 and an internal portion 19. The circumferential groove 14 divides the right shoulder region 17 in an internal portion 20 and an external portion 21. The width aspect ratio between the external portion (18 or 21) and the internal portion (19 or 20) preferably ranges from 60:40 to 80:20.

The main module 32 comprises a first lateral transverse groove 26, a first asymmetric transverse groove 25a, a second lateral transverse groove 27, and a second asymmetric transverse groove 25b.

As shown in FIG. 4, the first and second asymmetric transverse grooves 25a and 25b are each formed by a first and a second linear groove having a different length each other and joining in a vertex positioned in the central region, each linear groove being preferably formed by an external portion and an internal portion having different orientation. Similarly, the first and second lateral transverse groove 26 and 27 are each preferably formed by an external portion and an internal portion having different orientation. As illustrated in FIG. 4, in a preferred embodiment, the change from the orientation of the external portion to that of the internal portion corresponds to the intersection with the external circumferential grooves 11 and 14. On the other hand, the orientation change can be positioned at any point within the shoulder region.

The first asymmetric transverse grooves 25a is formed by a first linear groove 34 and a second linear groove 36 joining in the vertex 35. The first linear groove 34 preferably comprises the external portion 34a and the internal portion 34b. The second linear groove 36 preferably comprises the external portion 36a and the internal portion 36b.

The second asymmetric transverse grooves 25b is formed by a first linear groove 37 and a second linear groove 39 joining in the vertex 38. The first linear groove 37 preferably comprises the external portion 37a and the internal portion 37b. The second linear groove 39 preferably comprises the external portion 39a and the internal portion 39b.

The first lateral transverse groove 26 is preferably formed by the external portion 26a and the internal portion 26b. The second lateral transverse groove 27 is preferably formed by the external portion 27a and the internal portion 27b.

The external portions 26a, 34a, 36a, 27a, 37a and 39a form an angle β with respect to the radial plane of the tire. The angle β of each portion 26a, 34a, 36a, 27a, 37a and 39a can be equal or different. The angle β has an absolute value of from 0° to 20°, more preferably from 0° to 15°, and most preferably from 0° to 10°. tyre. Still most preferably, the angle β formed by the external portions 26a, 34a, 36a, 27a, 37a and 39a is equal to about 5°.

The internal portions 26b, 34b, 36b, 27b, 37b, and 39b form an angle α with respect to the radial plane of the tire. The angle α of each portion 26b, 34b, 36b, 27b, 37b, and 39b can be equal or different. The angle α has an absolute value of from 25° to 65°, more preferably from 30° to 60°, and most preferably from 35° to 55°. tyre. Still most preferably, the angle formed by the internal portions 26b, 34b, 36b, 27b, 37b, and 39b is equal to about 38°.

As illustrated in FIG. 4, in a preferred embodiment, the change from the orientation of the external portions 26a, 34a, and 37a to the orientation of the internal portions 26b, 34b, and 37b preferably corresponds to the intersection of the respective groove 26, 25a and 25b with the external circumferential groove 11.

As illustrated in FIG. 4, in a preferred embodiment, the change from the orientation of the external portions 36a, 27a, and 39a to the orientation of the internal portions 36b, 27b, and 39b preferably corresponds to the intersection of the respective groove 25a, 27, and 25b with the external circumferential groove 14.

The asymmetric transverse grooves 25a and 25b have the vertex 35 and 38 in the central portion 16 of the main module 32 axially offset with respect to the equatorial plane 10 of the tyre. The first asymmetric transverse groove 25a has its vertex 35 positioned between the first circumferential groove 12 and the equatorial plane 10 of the tyre. The second asymmetric transverse groove 25b has its vertex 38 positioned between the second circumferential groove 13 and the equatorial plane 10 of the tyre.

The lateral transverse grooves 26 and 27 end in the central portion 16 of the main module 32 away from the equatorial plane 10 of the tyre. The first lateral transverse groove 26 preferably ends between the first circumferential groove 12 and the equatorial plane 10 of the tyre, but can also extend until to cross the equatorial plane and to end between the second circumferential groove 13 and the equatorial plane 10 of the tyre, as illustrated by the dotted line. The second lateral transverse groove 27 preferably ends between the second circumferential groove 13 and the equatorial plane 10 of the tyre, but can also extend until to cross the equatorial plane and to end between the first circumferential groove 12 and the equatorial plane 10 of the tyre, as illustrated by the dotted line.

According to the invention, the sequence of asymmetric transverse grooves 25a and 25b together with the sequence of lateral transverse grooves 26 and 27, both crossing the circumferential grooves 12 and 13 define, in each main module 32 and in the whole tread 1, a pattern wherein each shoulder region 15 and 17 comprises a number "n" of blocks (three in the example illustrated in the FIGS. 1 to 13) which is equal to (1+a), wherein "1" is the number of lateral grooves for each shoulder region 15 and 17 and "a" is the number of asymmetric transverse grooves, and the central region 16 comprises a number "n−1" (that is "a") of blocks, (two as illustrated in the FIGS. 1 to 13).

According to a preferred embodiment of the invention, the external circumferential grooves 11 and 14 further divide each block of the shoulder regions 15 and 17 in two portions, namely an internal portion and an external portion, so forming a plurality of distinct blocks belonging to the internal and external shoulder portions, 19 and 20, and 18 and 21, respectively.

The main module 32 illustrated in FIG. 4 comprises a sequence of asymmetric transverse grooves 25a and 25b and lateral transverse grooves 26 and 27, wherein the distances, measured along the circumferential direction of the tread in the shoulder regions 15 or 17, between two consecutive transverse grooves are always the same. For sake of clarity, the term "two consecutive transverse grooves" means a pair of transverse grooves (that is, either asymmetric transverse grooves 25a and 25b or lateral transverse grooves 26 and 27) separated by a block free of additional transverse grooves. For example, in the main module 32 illustrated in FIG. 4, asymmetric transverse groove 25b is consecutive to asymmetric transverse groove 25a, when considering its portion in the shoulder region 15, but asymmetric transverse groove 25b is not consecutive to asymmetric transverse groove 25a when considering its portion in the shoulder region 17. This results in the definition of an uniform pattern of equivalent blocks in the shoulder regions 15 and 17 and an uniform pattern of specular blocks in the central region 16. Also, this results in a reciprocal specularity of asymmetric modules 30 and 31.

Figure 8:
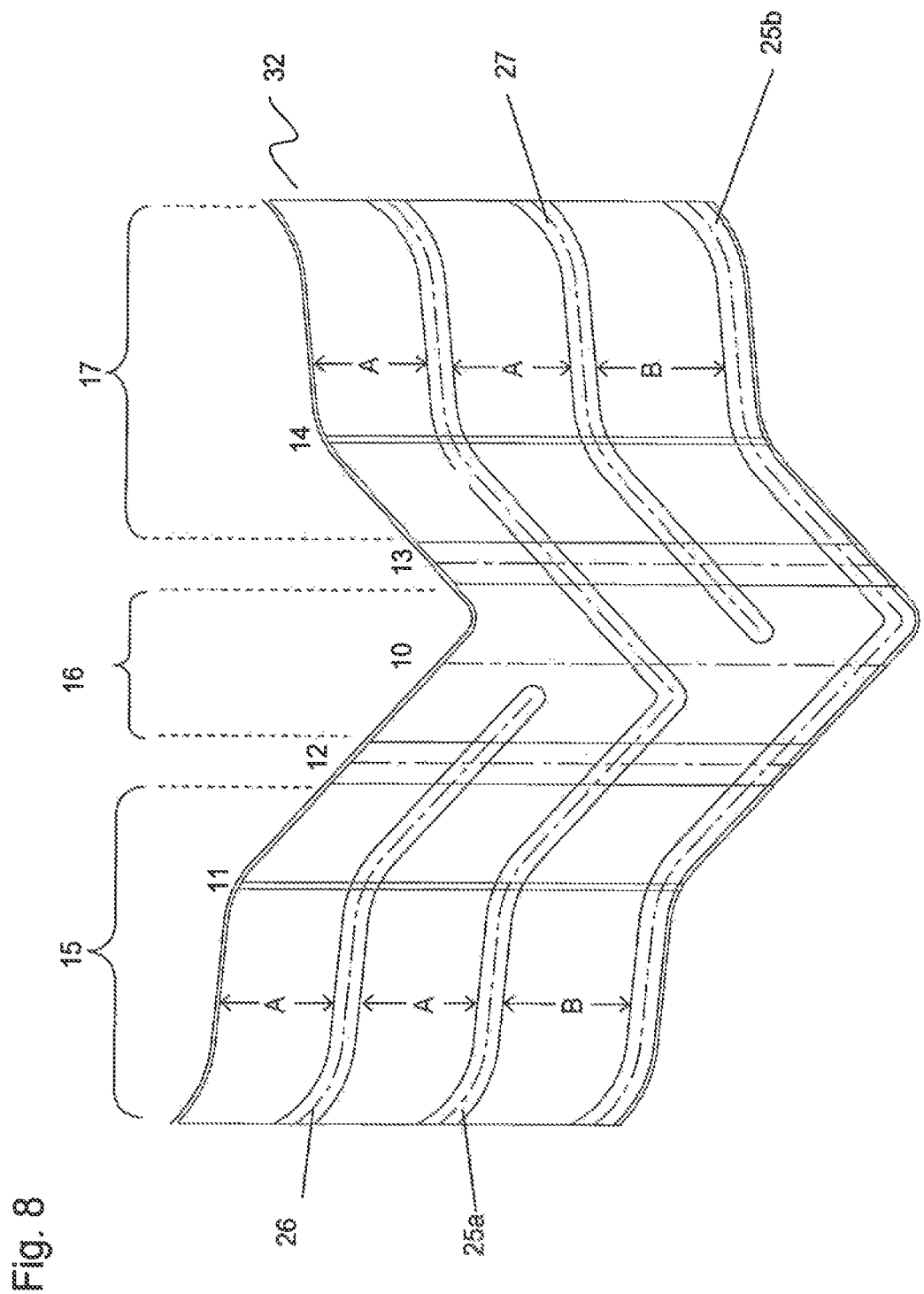
FIG. 8 is a plan view of the main module in accordance with a second embodiment of the present invention.

However, the main module 32 can comprise a sequence of asymmetric transverse grooves 25a and 25b and lateral transverse grooves 26 and 27, wherein the distances between two consecutive transverse grooves can be different each other, as illustrated for example in the embodiment of FIG. 8 (wherein distance B is different from distance A), in the embodiment of FIG. 9-a (wherein distances A, B, and C are all different each other) and in the embodiment of FIG. 9-b (wherein a different sequence of distances A,A,B and A,B,B is made on the left and right shoulder regions, 15 and 17, respectively). Further, the main module 32 can comprise a sequence of asymmetric transverse grooves 25a and 25b and lateral transverse grooves 26 and 27 so that all distances between two consecutive transverse grooves are different each other as illustrated in FIG. 9-c (wherein each distance A, B, C, D, E, and F is different each other).

The main module 32 illustrated in FIGS. 8 and 9 provides a pattern having a sequence of differently dimensioned blocks both in the shoulder regions and in the central regions. The Applicant has found that the preferred embodiments of FIGS. 8 and 9 further decrease the rolling noise of the tread.

The circumferential grooves 12 and 13 preferably have a width higher than the width of the circumferential grooves 11 and 14. Unless otherwise indicated, a width of a groove, a cut, a notch or similar elements is a measure taken on the top thereof, in correspondence of the tread surface. The width of circumferential grooves 12 and 13 is preferably between 5.0 mm and 20.0 mm. The width of circumferential grooves 11 and 14 is preferably between 0.5 mm and 10.0 mm.

Figure 5:
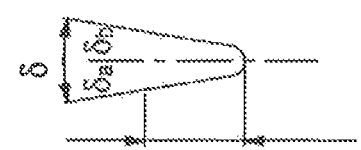
FIG. 5 is a cross section view through line B-B' of FIG. 2 or 3 showing the sidewall shape and orientation of the first circumferential groove.

The maximum depth $d_1$ of circumferential grooves 12 and 13 (as illustrated in FIG. 5) can preferably range between 5.0 mm and 10.0 mm, more preferably from 6.0 mm to 9.0 mm. The circumferential grooves 12 and 13 preferably have a depth $d_1$ of about 7.5 mm. The circumferential grooves 11 and 14 preferably have a maximum depth $d_2$ lower than or equal to the maximum depth $d_1$ of the circumferential grooves 12 and 13. The maximum depth $d_2$ of circumferential grooves 11 and 14 is preferably between 0.5 mm and 10.0 mm, more preferably from 2.0 mm to 8.0 mm.

Figure 7:
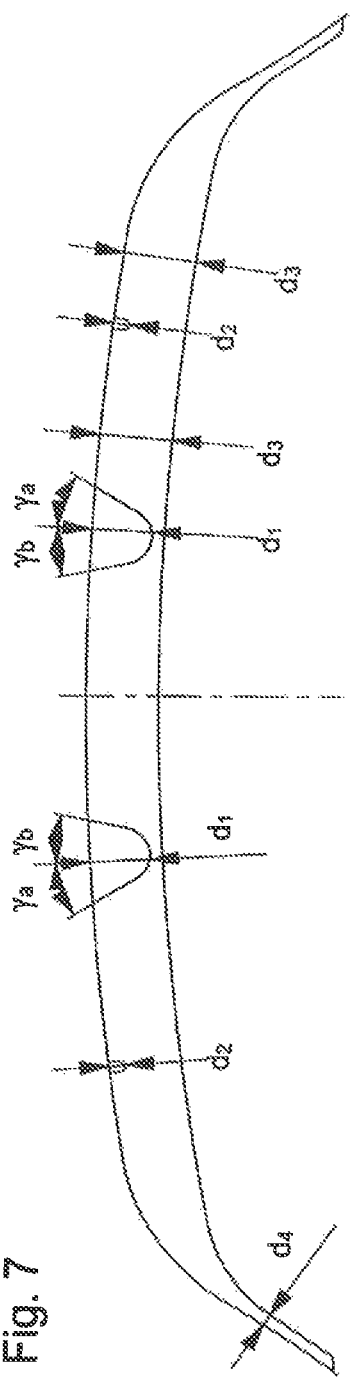
FIG. 7 is a cross section view through line D-D of FIG. 2 or 3 showing the transverse profile of a sidewall of the transverse groove.

The sidewalls of the circumferential grooves 12 and 13 preferably form an angle $\gamma$ of from 25° to 65° each other, more preferably from 35° to 55°. Still more preferably, the sidewalls of the circumferential grooves 12 and 13 form an angle of about 45° each other. As illustrated in FIGS. 5 and 7, the external sidewall is preferably more angled than the internal sidewall, i.e., the angle $\gamma_a$ formed by the external sidewall with the plane normal to the surface of the tread is higher than the angle $\gamma_b$ formed by the internal sidewall with the plane normal to the surface of the tread. Preferably, the angle $\gamma_a$ is at least 5°, more preferably at least 10°, higher than the angle $\gamma_b$.

According to another embodiment of the invention, each portion of the circumferential grooves 11 to 14 within two consecutive transverse grooves can be angled with respect of the equatorial plane of the tyre as illustrated in FIG. 13. The angles $\varepsilon$ and $\varepsilon'$ can be equal or different each other and range from 0° to 20°, preferably from 5° to 15°.

According to another embodiment of the invention, each portion of the circumferential grooves 11 to 14 within two consecutive transverse grooves can be off-line each other as illustrated in FIG. 14. The distance d between the axes of two off-line consecutive portions of circumferential groove preferably ranges from 0 to the groove width, more preferably from 10% to 60% of the groove width.

The asymmetric transverse grooves 25 preferably have a width lower than the width of the circumferential grooves 12 and 13. The width of asymmetric transverse grooves 25 is preferably between 3.0 mm and 9.0 mm.

Figure 6:
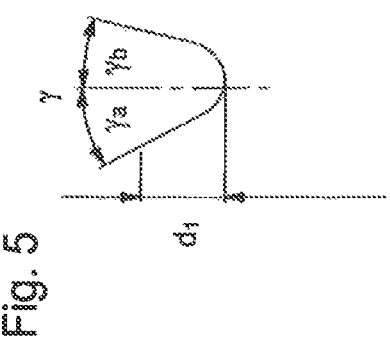
FIG. 6 is a cross section view through line C-C of FIG. 2 or 3 showing the sidewall shape and orientation of the transverse grooves.

The maximum depth $d_3$ (as illustrated in FIG. 6) of asymmetric transverse grooves 25 is preferably between 5.0 mm and 15.0 mm, more preferably from 7.0 mm to 12.0 mm. The asymmetric transverse grooves 25 preferably have a depth $d_3$ of about 9.0 mm. As illustrated in FIG. 7, showing the transverse profile of a sidewall of an asymmetric transverse groove, the asymmetric transverse grooves 25 preferably have a maximum depth $d_3$ higher than the maximum depth $d_1$ and $d_2$ of circumferential grooves 11 to 14. As illustrated in FIG. 7, in the shoulder regions 15 and 17 the depth of asymmetric transverse grooves 25 progressively reduces up to a minimum depth $d_4$ ranging from 0.5 mm and 10.0 mm, preferably from 2.0 mm to 8.0 mm.

As showed in FIG. 6, the sidewalls of the asymmetric transverse grooves 25 preferably form an overall angle $\delta$ of from 10° to 30° each other, more preferably from 15° to 25°. The front and back sidewalls of the asymmetric transverse grooves 25 can be differently angled, i.e., the angle $\delta_a$ formed by the front sidewall with the plane normal to the surface of the tread can be lower than or higher than the angle $\delta_b$ formed by the rear sidewall with the plane normal to the surface of the tread. Preferably, the angle $\delta_a$ is at least 5°, more preferably at least 10°, lower than or higher than the angle $\delta_b$.

The lateral transverse grooves 26 and 27 preferably have the same width and depth of the transverse grooves 25. Accordingly, the lateral transverse grooves 26 and 27 preferably have a width lower than the width of the circumferential grooves 12 and 13. The width of lateral transverse grooves 26 and 27 is preferably between 3.0 mm end 9.0 mm.

Similarly, the maximum depth of lateral transverse grooves 26 and 27 is preferably between 5.0 mm and 15.0 mm, more preferably from 7.0 mm to 12.0 mm. As illustrated in FIG. 6, the asymmetric transverse grooves 25 preferably have a depth of about 9.0 mm. Further, the lateral transverse grooves 26 and 27 preferably have a maximum depth higher than the maximum depth of circumferential grooves 11 to 14.

Finally, the sidewalls of the lateral transverse grooves 26 and 27 preferably form an angle $\delta$ of from 10° to 30° each other, more preferably from 15° to 25°. The front and back sidewalls of the lateral transverse grooves 26 and 27 can be differently angled, i.e., the angle $\delta_a$ formed by the front sidewall with the plane normal to the surface of the tread can be lower than or higher than the angle $\delta_b$ formed by the rear sidewall with the plane normal to the surface of the tread. Preferably, the angle $\delta_a$ is at least 5°, more preferably at least 10°, lower than or higher than the angle $\delta_b$.

In the present invention, a plurality of transverse sipes are formed in the shoulder regions 15 and 17 and the central region 16 of the asymmetric modules 30 and 31. Typically, transverse sipes are thin cuts formed into a tread block having a width in the range from about 0.2% to 0.8% of the tread width. Sipes are typically formed by steel blades inserted into a cast or machined mould. The number and shape of the transverse sipes is not particularly limited. Preferably, the number of transverse sipes for each block of the asymmetric modules 30 or 31 is ranging from 1 to 20, more preferably from 1 to 10, most preferably from 1 to 5. The shape of the transverse sipes, on a plan view, can be a linear shape, a zigzag shape, a curved shape, or a mix thereof. Preferably, the transverse sipes have a linear shape.

According to a preferred embodiment, each of said asymmetric modules 30 and 31 comprises at least one transverse sipe formed in said at least one central region continuously joined to a corresponding sipe formed in at least one of said shoulder regions by a corresponding sipe formed in at least one of said circumferential grooves.

As illustrated in FIG. 10, a plurality of transverse sipes 40d and 40e formed in the circumferential grooves 12 and 13 continuously joins a corresponding plurality of transverse sipes 40b formed in the central region 16 with a corresponding plurality of transverse sipes 40a formed in the left shoulder region 15 or a corresponding plurality of transverse sipes 40c formed in the right shoulder region 17 of the main module 32. The plurality of transverse sipes 40a, 40b, 40c, 40d, and 40e can form an angle having an absolute value of from 0° to 65°, more preferably from 0° to 50°, and most preferably from 0° to 30°, with respect to the radial plane of the tyre. The maximum depth of transverse sipes 40a, 40b, 40c, 40d, and 40e ranges from 5.0 mm to 15.0 mm, more preferably from 7.0 mm to 12.0 mm. The minimum depth of transverse sipe 40 ranges from 1.0 mm to 5.0 mm, more preferably from 2.0 mm to 4.0 mm.

According to a more preferred embodiment, illustrated in FIGS. 11 and 12, each of the asymmetric modules 30 and 31 comprises at least one transverse sipe 40 extending continuously from one shoulder region 15 to the central region 16 and to the opposite shoulder region 17, including the circumferential grooves 11, 12, 13 and 14. The number of transverse sipes 40 for each asymmetric module 30 or 31 is preferably ranging from 1 to 20, more preferably from 1 to 10.

As shown in FIG. 11, the transverse sipe 40 has preferably a V shape similar to the shape of the asymmetric transverse grooves 25. Accordingly, the transverse sipe 40 is formed by a first linear sipe 41 and a second linear sipe 42 joining in the vertex 43, each linear sipe being preferably formed by an external portion (41a, 42a) and an internal portion (41b, 42b) having different orientation. As illustrated in FIG. 11, in a preferred embodiment, the change from the orientation of the external portion to that of the internal portion corresponds to the intersection with the external circumferential grooves 11 and 14.

The external portions 41a and 42a form an angle β having an absolute value of from 0° to 20°, more preferably from 0° to 15°, and most preferably from 0° to 10°, with respect to the radial plane of the tyre. The internal portions 41b and 42b form an angle α having an absolute value of from 25° to 65°, more preferably from 30° to 60°, and most preferably from 35° to 55°, with respect to the radial plane of the tyre.

As illustrated in FIG. 12, the transverse sipe 40 has a maximum depth $d_5$ which is deeper than the maximum depth $d_1$ and $d_2$ of circumferential grooves 11 to 14. Preferably, in the vicinity of the circumferential grooves 11 to 14 the depth of the transverse sipe 40 is progressively reduced up to a minimum, different from zero, and then follows, with an increased proportion, the profile of the circumferential grooves. The maximum depth of transverse sipe 40 is preferably between 5.0 mm and 15.0 mm, more preferably from 7.0 mm to 12.0 mm. The minimum depth $d_6$ of transverse sipe 40 is preferably between 1.0 mm and 5.0 mm, more preferably from 2.0 mm to 4.0 mm.

The Applicant has found that the provision of continuous sipes according to the invention further improves the effectiveness of the sipes in the traction and the grip on snow and/or ice, probably due to the formation of a continuous strip of snow trapped within a continuous sipe, which resulted to be more efficient and more effective in promoting grip and traction on snow and/or ice than an equivalent length of discontinuous sipes.

On the other hand, a lower number of sipes can be formed to obtain the same traction and grip of the tread on snow and/or ice. Consequently, the stiffness of the tread elements is increased so giving better performances in terms of rolling noise, driving stability and tread wear when driving on dry road.

The tread pattern according to the present invention can be provided on a tyre having any conventional structure, such as those comprising a carcass, a tread band located on the crown of said carcass, a pair of axially superimposed sidewalls terminating in beads reinforced with bead wires and corresponding bead fillers, for securing said tyre to a corresponding mounting rim.

The tyre preferably also comprises a belt structure interposed between the carcass and the tread band. The carcass is reinforced with one or more carcass plies associated to said bead wires, while the belt structure generally comprises two belt layers, usually comprising metal cords, parallel to each other in each layer and crossing over those of the adjacent layers, preferably inclined symmetrically with respect to the equatorial plane, and radially superimposed on each other. Preferably, the belt structure also comprises a third belt layer, in a radially outermost position, provided with rubberized cords, preferably textile cords, oriented circumferentially, i.e. with a disposition at substantially zero degrees with respect to said equatorial plane.

The invention claimed is:

1. A tyre for a vehicle wheel having a tread pattern comprising:
   a) at least two circumferential grooves which define a first and a second shoulder region, and at least one central region;
   b) a plurality of asymmetric transverse grooves having a substantially "V" shape, which substantially extend for the whole width of the tread, said plurality of asymmetric transverse grooves comprising an alternate sequence of a first asymmetric transverse groove and a second asymmetric transverse groove defining an alternate sequence of a first asymmetric module and a second asymmetric module, wherein said first and second asymmetric transverse grooves each have a respective vertex in said central region that is axially offset with respect to an equatorial plane of the tyre; and
   c) a plurality of lateral transverse grooves, which comprises at least one first lateral transverse groove substantially extending for the whole width of said first shoulder region and for a portion of said at least one central region of said first asymmetric modules, and at least one second lateral transverse groove substantially extending for the whole width of said second shoulder region and for a portion of said at least one central region of said second asymmetric modules,
   wherein each sequence of said first asymmetric module and said second asymmetric module forms a main module; and
   wherein in the main module the second asymmetric transverse groove is consecutive to the first asymmetric transverse groove, when considering its portion in the first shoulder region, but the second asymmetric transverse groove is not consecutive to the first asymmetric transverse groove when considering its portion in the second shoulder region.

* * * * *